United States Patent [19]

Anthoney et al.

[11] Patent Number: 4,834,874
[45] Date of Patent: May 30, 1989

[54] REMOVAL OF LIQUID FROM A LIQUID-SOLIDS MIXTURE

[75] Inventors: William R. Anthoney, Tequesta, Fla.; Richard K. Young, Bartlesville, Okla.; Brian H. Limoges, Houston, Tex.

[73] Assignee: Phillips Petroleum Company, Bartlesville, Okla.

[21] Appl. No.: 212,362

[22] Filed: Jun. 27, 1988

Related U.S. Application Data

[62] Division of Ser. No. 045,109, Apr. 29, 1987, Pat. No. 4,778,605.

[51] Int. Cl.$^4$ ............................................. B01D 37/08
[52] U.S. Cl. ...................................... 210/179; 210/180; 210/184; 210/188; 210/316; 159/DIG. 16; 159/901
[58] Field of Search ................................ 210/177–180, 210/184, 188, 295, 298, 319, 316; 159/DIG. 2, DIG. 16, 901; 202/197, 175

[56] References Cited

U.S. PATENT DOCUMENTS

| | | | |
|---|---|---|---|
| Re. 29,605 | 4/1978 | Ziegenhain et al. | 502/439 |
| 2,871,108 | 1/1959 | Knapp | 422/228 |
| 3,078,144 | 2/1963 | Brown et al. | 502/107 |
| 3,515,199 | 6/1970 | Summers | 210/770 |
| 3,865,894 | 2/1975 | Kirsch et al. | 260/683.43 |
| 3,953,413 | 4/1976 | Hwang et al. | 502/319 |
| 4,045,293 | 8/1977 | Cooksley | 202/197 |
| 4,046,684 | 9/1977 | Tsunoda et al. | 210/20 |
| 4,048,067 | 9/1977 | Cheng | 210/73 R |
| 4,066,417 | 1/1978 | Drake et al. | 23/289 |
| 4,082,606 | 4/1978 | Houston et al. | 159/901 |

Primary Examiner—Richard V. Fisher
Assistant Examiner—Coreen Y. Lee
Attorney, Agent, or Firm—William R. Sharp

[57] ABSTRACT

An apparatus and method are provided wherein liquid is removed from a liquid-solids mixture by employing both filtration and low pressures to achieve vaporization of liquid. The mixture is introduced to a vessel in which the mixture is filtered so that a substantial portion of the liquid is withdrawn from the vessel. The vessel is then depressurized to an extent necessary to vaporize a substantial portion of the remaining liquid. Such vapor is withdrawn from the vessel. During vaporization, the contents of the vessel are agitated and heated.

8 Claims, 2 Drawing Sheets

REMOVAL OF LIQUID FROM A LIQUID-SOLIDS MIXTURE

This is a divisional of application Ser. No. 045,109, filed Apr. 29, 1987, now U.S Pat. No. 4,778,605.

BACKGROUND OF THE INVENTION

This invention relates to a method and apparatus for removing liquid from a liquid-solids mixture. The invention is particularly applicable to slurries containing a polymerization catalyst solid product.

A continual problem in the field of polymerization catalyst production is drying of the catalyst product. Typical processes produce a slurry comprising the desired solid catalyst product in admixture with a solvent or solvents. Removal of the solvent is therefore necessary.

One prior technique involves replacing a typical process solvent such as toluene with a lighter, more volatile solvent in a washing tank. The object is to select a lighter solvent, such as butane, which can vaporize, unlike toluene, at "positive" pressures greater than atmospheric pressure. Removing the lighter solvent at a positive pressure in this manner is intended to minimize the risk of contamination and possible deactivation of the catalyst which can result from oxygen and/or water vapor entering the system from the surrounding environment. However, this desired reduction in contamination is to a large extent defeated by the solvent exchange process itself which requires additional equipment and process steps to thereby increase the chance of catalyst contamination. In addition, the requirement for such additional equipment, solvent and process steps makes this drying technique undesirably expensive. Finally, optimum drying is not usually achievable at the pressure employed.

SUMMARY OF THE INVENTION

It is, therefore, an object of this invention to provide a method and apparatus which effectively remove liquid from a liquid-solids mixture.

It is also an object of the invention to provide such an apparatus and method which requires a minimum of process time and equipment.

The above objects are realized in a method for removing liquid from a liquid-solids mixture comprising the steps of: (a) introducing the mixture to a vessel; (b) filtering the mixture within the vessel after step (a) so as to withdraw a substantial portion of the liquid from the vessel through a least one filter; (c) withdrawing from the vessel gases present in the vessel after step (b) so as to depressurize the vessel to predetermined pressure conditions whereby liquid remaining in the vessel after step (b) tends to vaporize; (d) maintaining the above-mentioned pressure conditions for a period of time so that a substantial portion of liquid remaining the vessel after step (b) vaporizes to a vapor; (e) heating the contents of the vessel during step (d); (f) agitating the contents of the vessel at least during step (d); (g) withdrawing the vapor from the vessel during step (d); and (h) withdrawing substantially dry solids from the vessel after steps (d) and (g).

According to another aspect of the invention, an apparatus for removing liquid from a liquid-solids mixture comprises: a vessel; a means for introducing the liquid-solids mixture to the vessel; a first filtration means, including at least one filter, for filtering the mixture so as to withdraw only liquid from the vessel after having passed through the filter(s); a means for depressurizing the interior of the vessel whereby liquid in the vessel can be vaporized to produce a vapor; a means for heating the interior of the vessel; a means for agitating any contents contained by the vessel; a means for withdrawing vapor from the vessel; and a means for withdrawing solids from the vessel.

According to a preferred embodiment, a gas, preferably nitrogen, can be flowed through the interior of the vessel during vaporization of the liquid and withdrawal of vapor from the vessel. This feature has several beneficial effects which are hereinafter described in the Detailed Description of the Invention.

The invention has many advantages associated therewith. For example, heating of the vessel contents having during vaporization enhances vaporization, while agitation helps prevent clumping and also enhances evenly distributed heat transfer to the vessel contents. The combination of filtration and vaporization of liquid after depressurization achieves a high degree of dryness of the final product in a shorter period of time as compared with, for example, the above-described solvent exchange technique. Furthermore, contamination of the solid product is reduced by the minimal equipment and number of process steps required, which also means less expense.

DETAILED DESCRIPTION OF THE INVENTION

A preferred embodiment of the invention will now be described with reference to the Figures. Although this preferred embodiment is described in terms of removal of solvent from a solvent-solid catalyst mixture, it should be apparent that the invention can be applied to any liquid-solids mixture. It should also be noted that various parameter values given in the following description are given purely by way of example for the purpose of further illustrating and clarifying the invention, and should not be construed to limit the invention in any manner.

Figure 1:
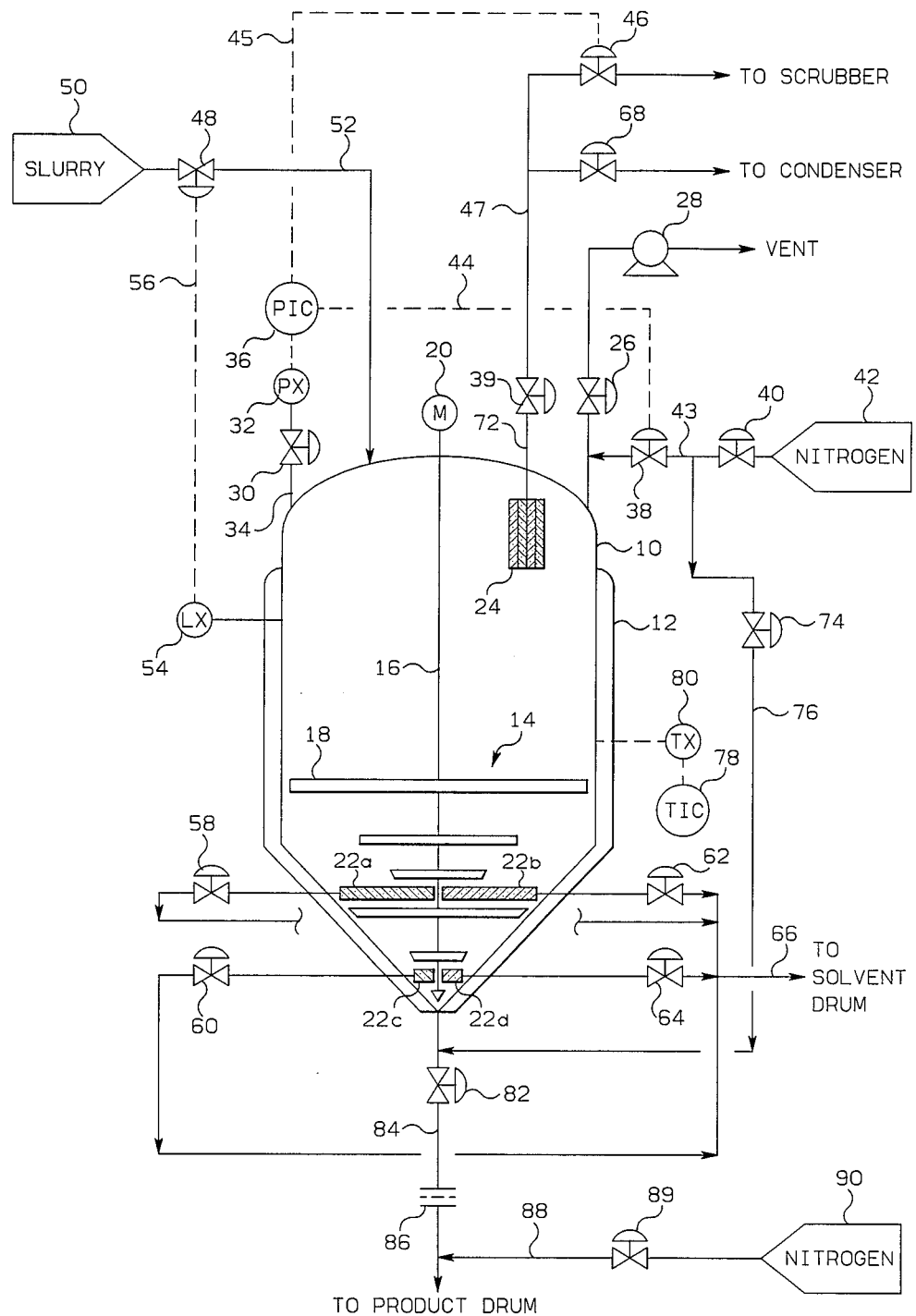
FIG. 1 is a diagrammatic illustration of an apparatus in accordance with the invention.

Referring now to FIG. 1, an apparatus in accordance with the invention for removing solvent from a solvent-polymerization catalyst mixture is shown. It is emphasized that FIG. 1 is a simplified schematic which omits details not pertinent to the invention. The illustrated apparatus includes a vessel 10 which has a cylindrical upper portion and a conical lower portion. An electrical heating blanket 12 surrounds a substantial portion of the vessel cylindrical portion and all of the vessel conical portion so as to contact the exterior surface of the vessel. As will be discussed further below in connection with temperature control, several such blankets can be provided rather than a single blanket as shown. Heating blanket 12 is an electrical resistance heater which can comprise, for example, a fiberglass material embedde with a suitable conductor which increases in temperature upon application of an electrical current from a suitable current source (not shown). A particularly suitable resistance heater for use in the present invention is sold under the trademark Briskheat ® by Briscoe Manufacturing Company of Columbus, Ohio. It is within the scope of certain aspects of the present invention to use any suitable means for heating the heating vessel 10 and its contents.

The illustrated apparatus further includes an agitator, shown generally at 14, for agitating contents of vessel 10. Agitator 14 includes a shaft 16 disposed generally along the longitudinal axis of vessel 10, a plurality of impellors 18 which radially extend from shaft 16, and a motor 20 for rotating shaft 16 about a rotational axis which corresponds to the vessel longitudinal axis. In the illustrated embodiment, the longitudinal axis of each impellor is offset with respect to the longitudinal axis of an immediately adjacent impellor by about 60 degrees in a progressive fashion from top to bottom. Therefore, some impellors illustrated in FIG. 1 appear foreshortened because of their angular orientation. Preferably, the blades of each of the impellors are "pitched" so that they form an acute angle with respect to the vertical. This causes rotation of the impellors which impart an upward force to contents of the vessel so as to effectively avoid packing at the bottom of the vessel among other advantages. The degree of "pitch" for the impellors can vary widely to achieve this effect, but a pitch of about 10 degrees for the top five illustrated impellors and a very steep pitch of about 60 degrees to about 80 degrees for the bottom impellor has been found to most effectively agitate contents of the vessel. Additionally, it is preferable that there be a minimum of clearance, for example 1–2 inches between the ends of each impellor and the interior surface of vessel 10 so as to assist in the preventing of caking of material on the interior surface of vessel 10.

Various filters are also provided in the FIG. 1 apparatus which are capable of filtering liquid-solids mixtures and vapor-solids mixtures. Filters 22a–d, schematically shown in FIG. 1 as being positioned within vessel 10 near the lower end thereof, can be any suitable filtering devices for separating liquids and solids. Filter 24, positioned, in the illustrated embodiment near the upper end of vessel 10, can comprise any suitable filtering device or devices for effectively separating vapor from solids. Filters 22a–d can each be a cartridge filter and filter 24 can comprise a plurality of cartridge filters. When dealing with a polymerization catalyst, typical filter pore sizes can be, by way of example, about 2 microns for filters 22a–d filter 24.

Various other components of the illustrated apparatus are individually conventional. For example, the valves shown can be automatically controllable by any suitable signal such as electrical or pneumatic signals. It is particularly desirable that the valves employed be of a high quality and well sealed so as to effectively operate substantially without leaks in the low pressure conditions hereinafter described.

Conduit lines are shown in FIG. 1 as solid lines. Dashed lines in FIG. 1 schematically indicate signal lines which can be electrical or pneumatic, for example.

Transducers and controllers shown in FIG. 1 are well known to those skilled in the art. A transducer detects the value of a particular parameter and generates a signal representative thereof which is provided to a controller. The controller compares the signal from the transducer to a set point, representative of a desired parameter value, and in response generates a control signal.

Gas sources in the illustrated apparatus are shown to supply nitrogen, which is preferred, although it is within the scope of the invention to employ a gas other than nitrogen, provided it is relatively inert and will not react with the solids within vessel 10.

Operation of the illustrated apparatus in separating a solvent from a polymerization catalyst will now be described.

First, vessel 10 is emptied of any liquid or solids and is appropriately evacuated by opening valve 26 and activating vacuum pump 28. Most preferably, vessel 10 is evacuated to a very low pressure of for example about 100 to about 200 microns Hg abs. at which the entire system can be checked for leaks.

All valves are now closed, and in the following discussion are assumed to be closed unless otherwise specified.

Valve 30 is opened to allow communication between pressure transducer 32 and the interior of vessel 10 via line 34. Pressure transducer 32 accordingly detects the pressure within vessel 10 and generates a signal representative thereof which is transmitted to pressure indicator and controller 36, hereinafter sometimes referred to simply as pressure controller 36. Pressure controller 36 is appropriately set so as to have a corresponding set point of about 5 to about 10 psig. Valves 38 and 40 are opened to allow nitrogen to flow from a nitrogen source 42, containing nitrogen at a relatively high pressure of for example 100 psig, to the interior of vessel 10 via line 43. A pressure drop is effected across valve 40 and a further pressure drop is effected across valve 38. Pressure controller 36 generates a signal in response to the comparison between the above-mentioned set point and the detected actual pressure and generates in response a control signal which is transmitted to either valve 38 via signal line 44, or to valve 46 via signal line 45. Valve 39 is opened to allow venting of nitrogen from vessel 10 through filter 24 and line 47, dependent on whether valve 46 is opened by pressure controller 36. Valves 38 and 46 are therefore respectively controlled so as to either allow further nitrogen into vessel 10 or vent nitrogen from vessel 10 to thereby provide a pressure of about 5 to about 10 psig within vessel 10.

While the pressure within vessel 10 is maintained as described above, valve 48 is opened to allow a slurry, comprising a mixture of solvent and particular catalyst, to pass from slurry source 50 into vessel 10 via line 52. The slurry can comprise, by way of example, a titanium trichloride propylene polymerization catalyst in admixture with a solvent such as toluene or hexane. A typical mixture of titanium trichloride catalyst and toluene includes about 20 to about 40 weight percent catalyst, and the remainder toluene. Valve 48 remains open until the slurry level within vessel 10 reaches a predetermined level which is detected by level transducer 54, which in response transmits a signal via signal line 56 to valve 48. In response to this signal valve 48 closes. Such control of valve 48 allows the vessel to be filled to a predetermined and desired level.

Once the vessel has been filled with slurry as described above, the set point for pressure controller 36 is set to a higher pressure value such as, for example, about 50 psig. Therefore, the interior of vessel 10 is pressurized to the desired pressure of for example about 50 psig by control of valves 38 and 46. This pressure is maintained by control of these valves during filtration of the solvent-catalyst mixture which is described below.

To accomplish such filtration, valves 58, 60, 62 and 64 are opened to allow solvent to flow through each of filters 22a-d, as assisted by the pressurized nitrogen in vessel 10, and through the various lines associated with filters 22a-d to line 66. Valves 58, 60, 62 and 64 are kept open until a substantial portion of the solvent in vessel 10 is withdrawn from the vessel. The withdrawn solvent flows through line 66 to a suitable solvent drum. Valves 58, 60, 62 and 64 are now closed.

By way of example, a typical total time for transfer of slurry to vessel 10 and filtration of such a slurry is about 1 hour for a slurry consisting of about 1000 lbs. of catalyst solids and about 300 gallons of solvent.

It is frequently desirable to rinse the interior of slurry source 50, which can be a tank for example, with a solvent to ensure that all of the catalyst is washed off of the interior walls of slurry source 50. The resulting catalyst-solvent mixture can be transferred to vessel 10 and filtered employing the same procedure described above.

The interior of vessel 10 is now depressurized to a pressure of for example about 5 to about 10 psig by appropriately resetting the set point of pressure controller 36.

Next, valve 26 is opened and vacuum pump 28 activated so as to withdraw gases remaining in vessel 10 after filtration to depressurize the interior of vessel 10 to a low pressure of for example about 10 mm Hg abs., whereby solvent remaining in the vessel tends to vaporize. The pressure of 10 mm Hg abs. is particularly suitable for the solvent toluene. These pressure conditions are maintained by appropriately operating vacuum pump 28 for a period of time so that a substantial portion of solvents remaining in the vessel vaporizes to a vapor. Of course, during maintenance of such low pressure conditions, valves and 46 are closed.

During maintenance of the above-mentioned low pressure conditions, open valve 39 allows venting of the vapor from vessel 10 through filter 24, line 47, open valve 68 and finally to a condenser. Such venting is allowed to occurr by maintaining an apparatus, such as a knockout pot, associated with the condenser at a pressure, for example about 7 mm Hg abs., lower than the pressure within vessel 10. As shown, the vapor is withdrawn from vessel 10 through the upper end of vessel 10 via line 72. Filter 24 acts to filter the vapor being passed therethrough to prevent withdrawal of entrained catalyst solids with the vapor.

Preferably, a continuous flow of nitrogen is allowed to pass through the interior of the vessel during at least some point in the vaporization and vapor withdrawal process by appropriately opening valves 40 and 74 to allow nitrogen to flow from nitrogen source 42 to the lower end of vessel 10 via line 76. Nitrogen accordingly flows at a flow rate of for example about 1 to about 5 SCFM through catalyst solids which accumlate near the vessel lower end, and upwardly through the vessel interior. The nitrogen then flows through filter 24 and exits the vessel through line 72. Several advantages result from such a flow of nitrogen through vessel 10. First, it enhances the vaporization process by decreasing the partial pressure of the solvent vapor. Second, such nitrogen flow assists in fluidizing the solid catalyst so as to separate the catalyst particles at the bottom of vessel 10 to enhance vaporization of solvent on the surfaces of the catalyst particles. Third, such nitrogen flow assists in carrying the vapor upwardly through filter 24. Although such a nitrogen flow can be provided at any point during vaporization and vapor withdrawal, it is considered preferable to provide such a flow of nitrogen near the end of vaporization and vapor withdrawal for several reasons. For example, this will decrease the partial pressure of the solvent vapor at a point in the process to enable vaporization of solvent which might not otherwise be vaporized. Also, adding a flow of nitrogen toward the end of vaporization and vapor withdrawal is particularly beneficial at this point in the process in enhancing vaporization due to fluidizing of the catalyst and is beneficial in carrying vapor out of the vessel which might otherwise remain in the vessel.

During vaporization of solvent and withdrawal of such vapor, it is preferable to monitor the temperature of vessel 10 by means of temperature indicator and controller 78 and temperature transducer 80. Typically, as the vaporization process progresses the temperature of the vessel will steadily drop from for example about 100°–110° F. to about 0°–10° F. At a point at which little vaporization is occurring, the temperature will begin to rise about 60° F. It is at this point that vacuum pump 28 is turned off and valve 26 closed. Typically, a non-measurable amount to 4 weight percent solvent remains in vessel 10.

During vaporization of solvent it is preferable that motor 20 is operated to thereby rotate impellors 18 and accordingly agitate the contents of vessel 10. If desired, such agitation can be provided at other times during the process described herein such as during filtration and/or withdrawal of solids from vessel 10. Agitation of the vessel contents assists in preventing clumping of a slurry therein, helps prevent caking on the top surface of a slurry which can undesirably insulate the bottom portion of the slurry, and also ensures that the vessel contents are evenly heated, in a manner hereinafter described, by constantly presenting new material to the heat transfer interior surface of vessel 10.

It is also preferably that an appropriate current is provided to heating blanket 12 so as to apply heat to the exterior surface of vessel 10 which is transferred to the vessel interior surface and finally to the contents of the vessel. Such heating of the vessel contents during vaporization of solvent enhances vaporization by replacing heat energy which is lost during vaporization of solvent. When dealing with catalyst-solvent mixtures it is important that the contents of vessel 10 are not heated above a temperature which will deactivate the catalyst. For example, for a titanium trichloride propylene polymerization catalyst in admixture with a toluene solvent, it has been found desirable to maintain the wall of vessel 10 at a temperature of about 110° F. by providing an appropriate set point to temperature and indicator controller 78, which controls a heating blanket current source (not shown) in response to a signal received from temperature transducer 80. For titanium trichloride catalyst, the contents of vessel 10 should be maintained below 122° F., at which temperature such a catalyst will be deactivated. As noted previously, electrical heating blanket 12 can be divided into two sections if desired in view of the fact that more energy is required to heat the contents of the conical portion of vessel 10 (due to vaporization occurring therein) than the contents within the cylindrical portion. A heating blanket section around the conical portion can consequently be provided with a higher watts/inch$^2$ rating than a blanket section surrounding the cylindrical portion. Separate temperature controllers can be provided for such separate heating blanket sections.

Following the completion of vaporization and withdrawal of vapor from vessel 10, vessel 10 is repressurized to for example about 5–10 psig. Valve 82 is then opened to allow the substantially dry solid catalyst to flow out of vessel 10 and into line 84. It should be noted that the catalyst solids behave as a free flowing powder and are easily withdrawn from vessel 10 simply by gravity. Catalyst solids accordingly flow from line 84 and through catalyst strainer 86. Catalyst strainer 86 filters out any undesirably large chunks of catalyst or foreign materials. The catalyst then flows through line 88 to a suitable product drum. To assist in preventing or breaking up of any bridging of catalyst particles within line 88, a flow of nitrogen can be provided through line 88 by opening valve 89 to allow nitrogen to flow from nitrogen source 90.

Figure 2:
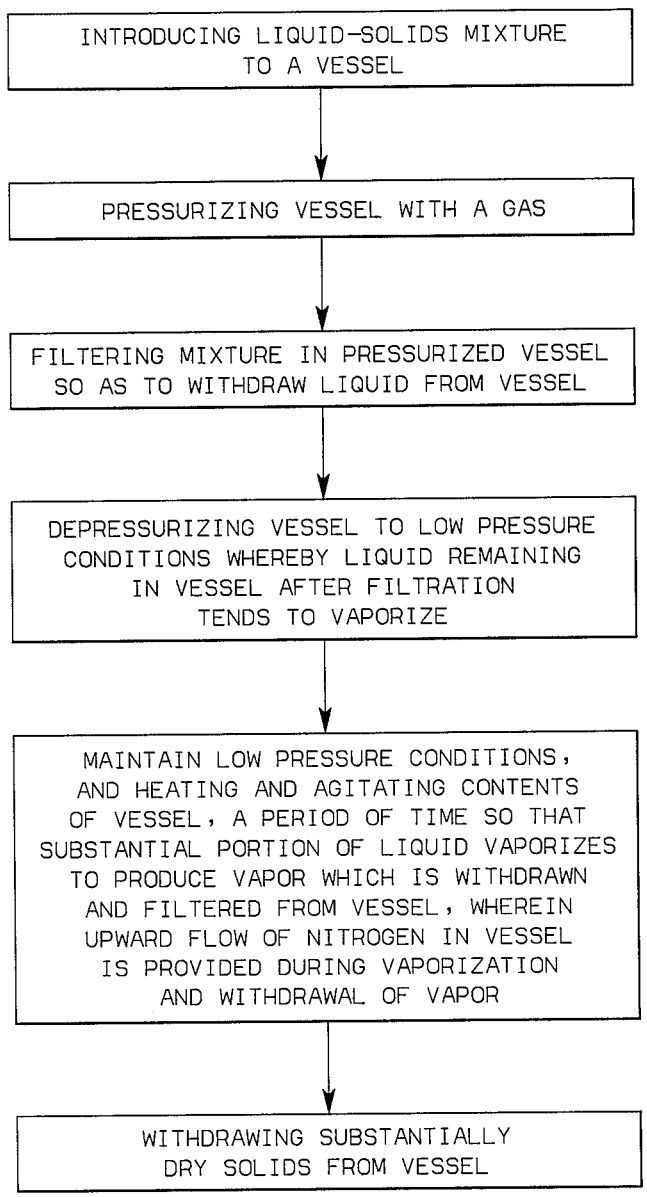
FIG. 2 is a flow chart illustrating various steps of a preferred embodiment in accordance with the invention.

Referring to FIG. 2, there is shown a flow chart which outlines the various steps of the preferred embodiment described above.

Thus, there is provided by the present invention an apparatus and method which effectively removes liquid from a liquid-solids mixture. It has been found, for example, that when applying the invention to a propylene polymerization catalyst in admixture with a solvent, substantially all of the solvent is typically removed from such a mixture. Moreover, such effective removal of liquid, or drying, requires less time than prior techniques due in part to the combination of filtration and "vacuum drying". Furthermore, contamination of a liquid-solids mixture being processed is kept to a minimum due to the small amount of equipment required which in turn minimizes expense.

Obviously many modifications and variations of the present invention are possible in light of the above teachings. It is therefore to be understood that within the scope of the appended claims the invention may be practiced otherwise than as specifically described.

That which is claimed is:

1. An apparatus for removing liquid from a liquid-solids mixture comprising:
   a vessel having an interior and an upper end and a lower end;
   means for introducing the liquid-solids mixture to said vessel;
   a first filtration means, including at least one filter positioned within the lower end of said vessel, for filtering the mixture so as to withdraw only liquid from said vessel after having passed through said at least one filter;
   depressurizing means, which includes a first conduit line, for depressurizing the interior of said vessel by withdrawing gases from said vessel through said first conduit line, so that liquid in said vessel is vaporized to produce a vapor;
   means for heating the interior of said vessel;
   means for agitating any contents contained by said vessel;
   vapor withdrawing means, which includes a second conduit line, for withdrawing said vapor from said vessel through said second conduit line; and
   means for withdrawing solids from said vessel.

2. An apparatus as recited in claim 1, further comprising means for supplying a gas to said vessel to pressurize the interior of said vessel.

3. An apparatus as recited in claim 2, wherein said at least one filter of said first filtration means is a cartridge filter.

4. An apparatus as recited in claim 3, wherein said vessel has an exterior surface, and wherein said heating means comprises at least one heating blanket surrounding and contacting the exterior surface of said vessel.

5. An apparatus as recited in claim 4, wherein said vessel has a longitudinal axis and wherein said agitating means comprises: a shaft disposed generally along the longitudinal axis of said vessel; at least one impellor which radially extends from said shaft; and means for rotating the shaft about a rotational axis which corresponds to said longitudinal axis.

6. An apparatus as recited in claim 5 further comprising a second filtration means associated with said vapor withdrawing means and positioned near the upper end of said vessel.

7. An apparatus as recited in claim 1 further comprising a means for providing a continuous flow of a gas through the interior of said vessel.

8. An apparatus as recited in claim 7, wherein said means for withdrawing vapor from said vessel withdraws the vapor through the upper end of said vessel, and wherein said means for providing a continuous flow of gas provides a generally upward flow of gas from the lower end of said vessel to the upper end of said vessel so as to exit the vessel through said upper end.

* * * * *